Patented Dec. 8, 1942

2,304,083

UNITED STATES PATENT OFFICE 2,304,083

CONVERSION OF HYDROCARBONS

Robert F. Ruthruff, Chicago, Ill., assignor to The Polymerization Process Corporation, Jersey City, N. J., a corporation of Delaware No Drawing. Application February 28, 1940, Serial No. 321,215

7 Claims. (Cl. 196—10)

This invention relates to the conversion of olefinic hydrocarbons to hydrocarbons of higher boiling points. More particularly the invention relates to the conversion of low-boiling olefinic hydrocarbons, to hydrocarbons of higher boiling points to produce a motor fuel of high anti-knock value, by contact thereof at elevated temperature with catalytic contact material comprising cobalt pyrophosphate as an essential ingredient.

Any suitable method may be used for the preparation of the catalytic contact material employed in the present invention, but it is found that the formation of the cobalt pyrophosphate may be effected conveniently by metathesis. A suitable cobalt salt and a soluble pyrophosphate may be reacted in solution to effect precipitation of the cobalt pyrophosphate.

Example

Solutions of the desired reactants are prepared by dissolving 145.52 grams of cobalt nitrate, $Co(NO_3)_2.6H_2O$, in 1000 cc. of water, and 111.54 grams of sodium pyrophosphate, $Na_4P_2O_7.10H_2O$, in 1200 cc. of water. The sodium pyrophosphate solution is added to the cobalt nitrate solution quickly with rapid stirring. A precipitate is formed, and the resulting mixture is stirred for a time to insure complete reaction and then filtered. The filter cake is washed, for example, by converting it into a slurry with water and re-filtering, this operation being repeated several times. The washed filter cake is dried at 220° F. for approximately 24 hours and then may be made into pellets of suitable size such as ⅛ inch. The material thus prepared consists substantially entirely of cobalt pyrophosphate and contains no free phosphoric acid.

It is to be understood that the above example merely illustrates one method of preparing the contact material in a convenient manner and that cobalt pyrophosphate prepared by other methods may be employed within the scope of the invention. Among other suitable methods for the preparation of cobalt pyrophosphate may be mentioned that involving the thermal decomposition of cobalt monoammonium or cobalt monohydrogen orthophosphate. For example, by well known procedures the highly insoluble cobalt monoammonium orthophosphate, $CoNH_4PO_4.H_2O$ may be precipitated, and this precipitate, after thorough washing, may be calcined at elevated temperatures to yield, quantitatively, cobalt pyrophosphate in accordance with the reaction:

$2CoNH_4PO_4.H_2O + heat = Co_2P_2O_7 + 2NH_3 + 3H_2O$

Cobalt salts other than cobalt nitrate and soluble pyrophosphates other than sodium pyrophosphate may be employed without departing from the scope of the invention.

Cobalt pyrophosphate apparently functions as catalytic material through the gradual and continuous release of an active modification thereof which is probably a reduction product, although it is to be understood that the invention is not to be limited by any theory regarding the mechanism of activation of the pyrophosphate. It is further believed that after initiation of reduction of the cobalt pyrophosphate to the active modification, by heating at elevated temperature in the presence of the reaction gases, the reduction continues with gradual release of the active modification. This is of advantage because the active modification is gradually rendered inactive, and fresh supplies of the active modification tend to maintain the activity of the contact material. Release of the active modification should be at a rate at least as rapid as that at which it is rendered inactive.

However, under certain conditions too rapid reduction may occur with resulting rapid loss of strength and relatively short life of the catalytic material. Under these circumstances it may be advantageous to prepare the pyrophosphate in a manner by which it is somewhat stabilized against reduction. It may be desirable, furthermore, to employ a mixture of cobalt pyrophosphate, a portion of which is stabilized against reduction and another portion of which is unstabilized against reduction. In the use of such a mixture the unstabilized portion of the cobalt pyrophosphate permits ready initiation of the activity of the catalyst while the stabilized portion is reduced at a rate which provides fresh supplies of the active modification at the desired rate in order to maintain the activity of the contact material for the greatest possible length of time.

Cobalt pyrophosphate may be stabilized against reduction by the adsorption or occlusion therein of a double salt of the soluble metal pyrophosphate employed as a precipitant and the cobalt pyrophosphate. The formation of the double salt may be effected by employing an excess of the soluble pyrophosphate over the amount which is stoichiometrically equivalent to the cobalt salt which it is desired to convert to the cobalt pyrophosphate. For example, cobalt pyrophosphate may be prepared in a manner similar to the above example, but by the employment of the sodium pyrophosphate in an amount which is 10% in excess of the amount equivalent to the cobalt salt according to the reaction:

Under these conditions there will be formed a double salt of sodium pyrophosphate and cobalt pyrophosphate which tends to stabilize the remaining cobalt pyrophosphate against reduction to the active modification. Initiation of the activity of contact material produced in this manner may be effected in an induction period at an elevated temperature, which may be somewhat higher than the temperature which may be desired for use in the conversion reaction. After activity is initiated at a higher temperature the temperature may be lowered to the reaction temperature since the reduction products formed at the high temperature apparently act as nuclei which promote the reduction of additional material, even though stabilized, at the lower temperature. However, the use of a mixture of a stabilized variety of the cobalt pyrophosphate with a substantial proportion of the unstabilized variety produced in accordance with with the above example may permit elimination of the high temperature induction period since the reduction products of the unstabilized variety of the cobalt pyrophosphate acts to promote reduction of the stabilized variety at the reaction temperature.

In the preparation of the unstabilized variety of cobalt pyrophosphate in larger batches or in more concentrated solutions than in the above example it is necessary to insure uniformity of the reaction throughout the mass in order to prevent formation of the double salt. This can be accomplished by employing an excess of the cobalt salt, by stirring the precipitate for some time or by digesting the precipitate at elevated temperature with stirring for some time, or by any combination of these steps. In any method of preparation of the cobalt pyrophosphate by precipitation methods it is desirable to add the pyrophosphate solution to the cobalt solution to avoid unnecessary formation of the double salt, this also being avoided by rapid agitation of the reaction mixture which prevents local accumulations of the soluble pyrophosphate in high concentrations.

The stabilized and unstabilized varieties of the cobalt pyrophosphate may be formed separately into pellets, optionally with the inclusion of supporting material, after which the pellets are admixed mechanically; or the two varieties, optionally with accompanying supporting material, may be admixed and then formed into pellets of suitable size for use as an improved contact agent for olefin polymerization.

While cobalt pyrophosphate may be employed as such as contact material for the polymerization reaction it may be used in admixture with other active materials, for example, pyrophosphates of certain materials other than cobalt such as copper, zinc, magnesium, iron, mercury and aluminum. Where other pyrophosphates are used these may be coprecipitated with the cobalt pyrophosphate or separately prepared and thereafter mixed with the cobalt pyrophosphate.

Supporting material may be employed in conjunction with the cobalt pyrophosphate. In the selection of such supporting materials, however, materials which are reactive, under the conversion conditions, with the active modification of the cobalt pyrophosphate should be avoided. Materials suitable for use as supporting materials include inactive phosphates, other salts which do not react with the active modification, and carbonaceous materials such as active charcoal, petroleum coke, etc.

In carrying out the conversion reaction the olefinic hydrocarbons or a mixture of hydrocarbons containing olefinic constituents are passed in contact with the catalytic material in a suitable chamber or reactor, the reaction gases being suitably preheated for the reaction. Any suitable pressure may be used but it is preferable to employ relatively high pressures, for example, in excess of 150 pounds per square inch although the catalytic material exhibits the polymerization activity at atmospheric pressure or below. As is well known to those skilled in the art, the rate of polymerization of olefinic hydrocarbons is a function of the concentration of these materials and accordingly from economic considerations such reactions are best run at superatmospheric pressure. The optimum operating temperature will depend somewhat upon the nature of the material under treatment and the product desired, but ordinarily will fall within the range of 300°–600° F. For example, in the conversion of gaseous olefins such as butylenes a temperature of 400° to 450° F. is advantageous for effecting maximum conversion to a product consisting essentially of gasoline motor fuel constituents.

The extent of reaction and the character of the liquid product are affected also by the length of time during which the charge remains in contact with the catalytic material under the operating conditions, that is, the specific velocity of the charge. In general, the charge is passed over the contact material at a rate of from 2 to 50 or more cubic feet of charge, measured as gas at standard conditions of temperature and pressure, per pound of catalytic material per hour. The space velocity may be expressed also on a volumetric basis. When, as in the preparation described above, the cobalt pyrophosphate has an apparent density of about one the charge rate may be expressed as 125 to 3120 or more volumes per hour per volume of contact material.

It is apparent that with any given charge the extent of reaction and the character of the product depend mainly on the operating pressure, the operating temperature and the space velocity of the charge. Many combinations of these variables will yield the desired amount and quality of product, but those skilled in the art will be able to select satisfactory conditions for producing the desired results without undue experimentation.

The invention will be illustrated by the following example of the use of the improved catalytic material in the polymerization of gaseous olefins to normally liquid products. It is to be understood, however, that the invention is not limited to such specific examples of the use of catalytic material for polymerizing gaseous olefins but is of wider scope in that the catalytic material may be employed also for the polymerization of normally liquid olefins to higher boiling products.

Cobalt pyrophosphate prepared in accordance with the foregoing example and formed into ⅛ inch pellets was used as a catalytic contact agent in the conversion treatment of a gaseous mixture containing 27% normal butylenes, 16% isobutylene and 57% butane by volume. The gas was passed over the catalyst under a pressure of 1400 pounds per square inch at a rate of approximately 36 cubic feet, measured as gas at standard conditions of temperature and pressure, per pound of contact material per hour. At a reaction temperature of 450° F. the liquid polymer yield was approximately 20% by weight based on the charge. This represented approximately 50% conversion by weight of the olefins charged.

If even more complete conversion of the olefins present had been desired in connection with the operation described above this could have been accomplished by changing one or more of the variables of temperature, pressure and space velocity discussed previously. In the operation described above this could be accomplished convenient by reducing the space velocity.

As mentioned above, the extent of conversion is affected by the above-mentioned variables of temperature, pressure and space velocity. The character of the liquid product is affected also by these variables in respect to its boiling point and in respect to its octane number. It may be desirable to limit the extent of conversion in order to obtain a product of the desired octane number. The effect of the extent of conversion on the octane number of the product is particularly noticeable in connection with the treatment of gaseous mixtures containing both normal butylenes and isobutylene. For example, in the treatment of a mixture of normal and isobutylenes by means of the contact material at a temperature such as that mentioned above it is found that conversion of the isobutylene proceeds more rapidly than the conversion of the normal butylenes, whereby limiting the time of contact of the charge with the catalytic material to a predetermined figure makes it possible to effect preferential conversion of the isobutylene and thus obtain a product of higher octane number. The variation in octane number with variation in conversion of normal and isobutylenes is especially noticeable in the polymerization products after hydrogenation. If a mixture of these olefins is polymerized under conditions wherein essentially only the isobutylene reacts, the resulting polymer, after hydrogenation, has an extremely high octane number. On increasing the severity of the polymerization conditions, increasing amounts of the normal butylenes react also and the resulting polymers, on hydrogenation, exhibit a progressively decreasing octane number.

The employment of the catalytic material of the invention in the conversion of olefins is advantageous in that it permits a production of polymers at a low unit cost of catalytic material. The catalyst employed in the process is very stable and is less susceptible to deactivation during use than catalysts of similar activity employed heretofore.

I claim:

1. The method comprising contacting relatively low-boiling olefinic hydrocarbons at elevated temperature with a catalytic contact material comprising as an essential ingredient cobalt pyrophosphate to effect conversion of said low-boiling olefinic hydrocarbons to higher-boiling hydrocarbons boiling within the gasoline boiling range.

2. The method of claim 1 wherein a mixture of normal and iso-olefin hydrocarbons is subjected to the conversion treatment, and the extent of conversion of the olefin mixture to higher-boiling products is limited to effect preferential conversion of iso-olefin hydrocarbons.

3. The method of claim 1 wherein a hydrocarbon mixture comprising normal butylenes and isobutylene is subjected to said conversion treatment and the extent of conversion of said olefin hydrocarbons to higher-boiling products is limited to effect preferential conversion of isobutylene.

4. The method of claim 1 wherein said contact material comprises a mechanical mixture of cobalt pyrophosphate which is stabilized against reduction and cobalt pyrophosphate which is unstabilized against reduction.

5. The method of producing normally liquid hydrocarbons boiling within the gasoline boiling range which comprises contacting normally gaseous olefin hydrocarbons at elevated temperature with catalytic contact material comprising as an essential ingredient cobalt pyrophosphate.

6. The method of converting butylene to gasoline motor fuel constituents which comprises contacting said butylene at elevated temperature with catalytic contact material comprising as an essential ingredient cobalt pyrophosphate.

7. The method which comprises contacting relatively low-boiling olefin hydrocarbons at elevated temperature with solid catalytic contact material consisting essentially of cobalt pyrophosphate to effect conversion of said relatively low-boiling olefin hydrocarbons to higher-boiling hydrocarbons boiling within the gasoline boiling range.

ROBERT F. RUTHRUFF.